Figure 1:
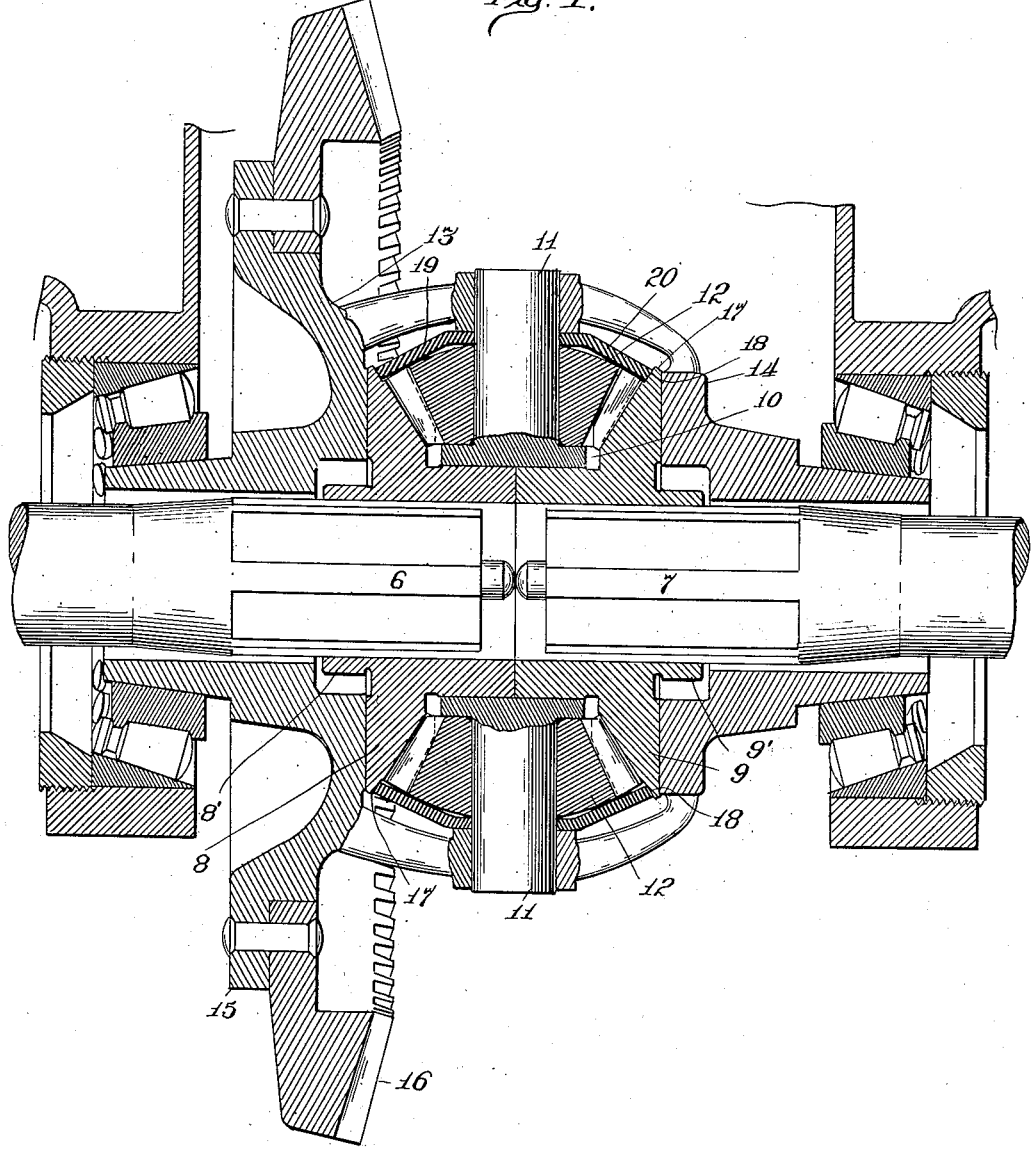

C. W. TAYLOR.
BRAKE MECHANISM FOR DIFFERENTIALS.
APPLICATION FILED MAR. 11, 1918. RENEWED SEPT. 25, 1919.

1,324,861.

Patented Dec. 16, 1919.
2 SHEETS—SHEET 1.

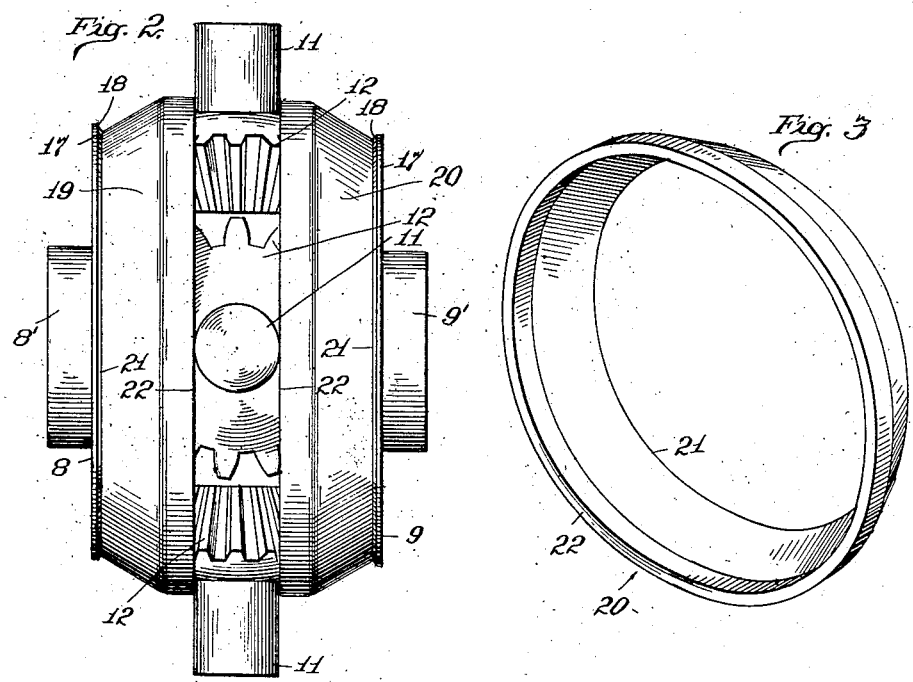
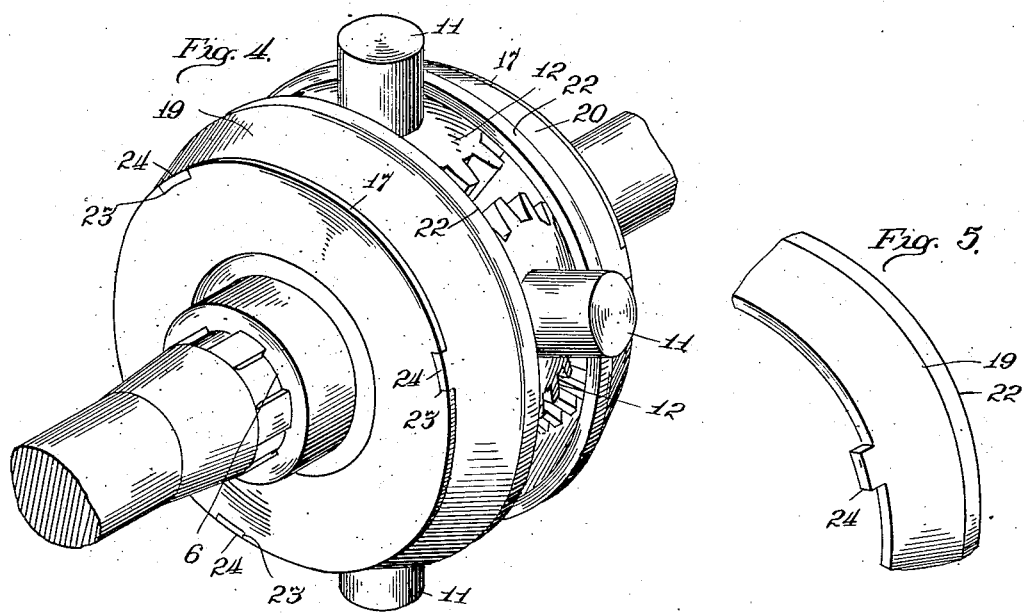

UNITED STATES PATENT OFFICE.

CLARENCE W. TAYLOR, OF CHICAGO, ILLINOIS, ASSIGNOR TO ONLAKE COMPANY, OF CHICAGO, ILLINOIS, A CORPORATION OF ILLINOIS.

BRAKE MECHANISM FOR DIFFERENTIALS.

1,324,861. \qquad Specification of Letters Patent. \qquad Patented Dec. 16, 1919.

Application filed March 11, 1918. Serial No. 221,669. Renewed September 25, 1919. Serial No. 326,384.

*To all whom it may concern:*

Be it known that I, CLARENCE W. TAYLOR, a citizen of the United States of America, residing at Chicago, in the county of Cook and State of Illinois, have invented certain new and useful Improvements in Brake Mechanism for Differentials, of which the following is a specification.

My invention relates to improvements in brake mechanism for differentials, particularly for automobiles, tractors, trucks and the like, and the principal objects of my improvement are:

First, to provide mechanism for each driven member of a differential on the adjacent ends of a divided shaft and in contact with the driving member to oppose relative rotative movement of the driven members.

Second, the provision of devices for preventing what is termed "spinning" of either vehicle or road wheel and to afford substantially equal distribution of power to both of said road wheels and permit ample compensation for the actual distance in travel of the road wheels when deviating from a straight ahead direction.

Third, to afford simplified parts and construction that can be easily made and assembled and in operation will give two-wheel positive drive.

This invention is an improvement in connection with the devices disclosed in my pending application filed November 20, 1916, Serial #132259, and my pending application filed October 10, 1917, Serial #195675.

With the foregoing and other objects in view, my invention consists in the novel features and in the novel combination and arrangement of parts hereinafter fully described, illustrated in the accompanying drawings forming a part of this specification, and particularly pointed out in the claims hereunto appended; it being understood that changes, variations and modifications in the details of the invention within the scope of the claims, may be resorted to without departing from or sacrificing any of the advantages thereof.

In the drawings,

Figure 1 is a longitudinal section of rear axle of an automobile with my improvement incorporated therewith, Fig. 2 is a plan view of the bevel gears, pinions and spider, with brake members assembled together, Fig. 3 is a perspective view of one of the brake members, Fig. 4 is a similar view of gears, pinions, spider and brake members in slightly modified form, Fig. 5 is a fragment in perspective of a brake member somewhat modified in form.

Similar numerals refer to similar parts throughout the several views.

I have discovered that in what is termed the "standard" or conventional type of differential mechanism the application of power to the pinions loosely mounted on the trunnions of the spider and in mesh with both of the bevel gears on the adjacent ends of the divided shaft for bodily rotation of such pinions under a load is very much greater than the amount of retarding or brake effort required to prevent relative rotative movement of the gears on the divided shaft. This is true even though one road wheel is off the surface. That the degree of frictional resistance or brake effort to accomplish such results is not enough to render impossible ample differentiation under a load when proceeding in a curved line.

For the purpose, among other things, of affording sufficient braking-action between the driven members on the adjacent ends of the divided shaft and the driver or power imparting means to prevent racing of either road wheel that temporarily may be "in the air" or off the road surface and to obviate "spinning" of either road wheel whatever the cause therefor, I have provided one embodiment of what are termed brake members which are incorporated with the ordinary bevel gear type of differential mechanism so as to render frictional resistance between the respective bevel gears and the driver or source of power to sufficiently oppose relative rotative movement of said gears and yet have ample differentiation of said gears when the forces acting at the periphery of the vehicle wheels are greater than the frictional resistance between the driven members or gears and the driver.

The numerals 6 and 7 denote the adjacent ends of a divided shaft on which is suitably fixed bevel gears 8 and 9 having hubs 8' and 9'. Between the gears 8 and 9 is disposed what is termed a spider or driver 10 having radial trunnions or shafts 11, each carrying a loosely mounted bevel pinion 12, constantly in mesh with both of said bevel gears. A rotatable housing composed of parts 13 and 14 are secured together in the well known manner by bolts or otherwise with their meeting edges formed with recesses to accommodate the outer ends of the trunnions or shafts 11 therebetween. The part 13 carries an outwardly extending flange 15 to which is fixed the ring gear 16 in mesh with the bevel pinions 12.

Preferably I form the periphery of each of the bevel gears 8 and 9 with an outwardly extending annular flange 17 with a friction face 18 thus providing a relatively large friction area for brake purposes.

The separate annular somewhat tapering brake members 19 and 20 are alike in construction and a description of one is a description of both. The outer end 21 of each said brake members is in frictional relation to a bevel gear and the inner end 22 of each brake member is in frictional relation to the driver or trunnions 11, both ends of each brake member being parallel with each other. The inner ends of the brake members are greater in diameter than the outer ends, a condition only made necessary by the particular environment of the brake members.

In Fig. 4 is shown a slightly modified form in which the bevel gears 8 and 9 have notches 23 in the annular flanges 17 and corresponding projections 24 (see Fig. 5) to limit frictional relation to the inner ends 22 of the brake members 19 and 20 and the driver or trunnions 11.

It is desirable that the forces acting at the periphery of the vehicle or road wheels be greater than the frictional resistance between the bevel gears and the driver to the end that adequate compensation be realized in operation of the car in a curved path.

No exact formula is given that is applicable to all self-propelled vehicles in determining the degree of frictional resistance required in small and heavy cars.

Light cars for passengers and heavy duty trucks vary greatly in the amount of force acting at the periphery of the vehicle wheels, and, naturally, actual trial of the degree of frictional resistance suited to the particular machine and the load intended to be carried is the best way to ascertain the ideal balance between the frictional resistance at the differential and the force acting at the periphery of the vehicle wheels.

It will be apparent the amount of braking-action between the bevel gears 8 and 9 and the driver 11 will depend upon frictional area, how tight the brake members 19 and 20 are put into operative positions, among other conditions.

Preferably the amount of friction exerted at the differential should not be much more than sufficient to successfully oppose relative rotative movement of the gears on the divided shaft when the vehicle is moving in a straight line, or when one such wheel is off the road surface temporarily or on a slippery or soft place.

It will be helpful to remember in the case of the bevel gear type of differential without my improvement, as long as the traction obtainable at both vehicle wheels remains greater than the tractive effort put forth, the differential acts as an equalizer or a balance gear and the power available is proportionately distributed between the two vehicle wheels. When one wheel loses all traction, however, the differential is no balance gear (without my improvement) as it then permits all the power to be transmitted to the one wheel which is rotating idly, the other wheel at which traction is available remaining, to all intents and purposes, dead.

Anything shown and described but not claimed herein, is shown, described and claimed in my copending application Serial #249,398.

On reference to the drawings in connection with the foregoing description and explanations it is thought the construction and operation of my improvement will be readily understood.

Having thus fully described my invention, what I claim as new, and desire to secure by Letters-Patent, is—

1. In brake mechanism for differentials, the combination with differential gearing connecting the adjacent ends of a divided shaft, including means to operate said gearing, of a plurality of brake members in frictional contact at one end with said gearing and in frictional contact at the other ends with said means to operate the gearing.

2. In brake mechanism for differentials, the combination with differential gearing connecting the adjacent ends of a divided shaft, shaft including a driver, of two annular brake members each in frictional contact at one end with one of said gears, both brake members being in frictional contact at the other ends with said driver.

3. In brake mechanism for differentials, the combination with differential gearing connecting the adjacent ends of a divided shaft, including a driver, of two brake members having parallel ends, each said member being in frictional contact at one end with one of said gears and both of said members being in frictional contact at their other ends with said driver.

4. In brake mechanism for differentials, the combination with a divided shaft having bevel gears fixed to the adjacent ends thereof and a driver, including radial trunnions carrying rotatably mounted bevel pinions in mesh with both of said bevel gears, of two brake members both having parallel ends and in frictional relation at one end with one of said bevel gears and at the other ends being in frictional relation to said driver.

5. In brake mechanism for differentials, the combination with a divided shaft having bevel gears fixed to the adjacent ends thereof, said gears each having an external annular flange thereon, a driver including radial trunnions carrying rotatably mounted bevel pinions in mesh with both of said bevel gears, of two brake members both having parallel ends and each being in frictional relation at one end with one of said flanges and at the other ends both being in frictional relation to said driver.

6. In brake mechanism for differentials, the combination with a divided shaft having bevel gears fixed to the adjacent ends thereof, said gears each having an external annular flange having a friction face thereon, a driver including radial trunnions carrying rotatably mounted bevel pinions in mesh with both of said bevel gears, of two brake members both having parallel ends and each being in frictional relation at one end with the friction face of one of said flanges and at the other ends both of said brake members being in frictional relation to said driver.

In testimony whereof I affix my signature.

CLARENCE W. TAYLOR.